United States Patent
Weng et al.

(10) Patent No.: US 11,662,736 B2
(45) Date of Patent: May 30, 2023

(54) METHOD AND APPARATUS FOR CONTROLLING MOVEMENT OF AUTONOMOUS MOBILE MACHINE, MACHINE, AND STORAGE MEDIUM

(71) Applicant: Guangzhou Automobile Group Co., Ltd., Guangdong (CN)

(72) Inventors: Shijing Weng, Guangdong (CN); Xiaobo Wang, Guangdong (CN); Hongshan Zha, Guangdong (CN); Mingzhe Qiu, Guangdong (CN); Xiaomin Lin, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 31 days.

(21) Appl. No.: 16/336,899

(22) PCT Filed: Aug. 3, 2018

(86) PCT No.: PCT/CN2018/098532
§ 371 (c)(1),
(2) Date: Mar. 26, 2019

(87) PCT Pub. No.: WO2019/184179
PCT Pub. Date: Oct. 3, 2019

(65) Prior Publication Data
US 2021/0341936 A1 Nov. 4, 2021

(30) Foreign Application Priority Data
Mar. 27, 2018 (CN) .................... 201810263018.9

(51) Int. Cl.
*G05D 1/02* (2020.01)
*B60W 60/00* (2020.01)
*B60W 50/00* (2006.01)

(52) U.S. Cl.
CPC .......... *G05D 1/0223* (2013.01); *B60W 50/00* (2013.01); *B60W 60/001* (2020.02); *B60W 2050/006* (2013.01); *B60W 2050/0026* (2013.01)

(58) Field of Classification Search
CPC .............. G05D 1/0223; G05D 1/0212; G05D 2201/0217; B60W 50/00; B60W 60/001;
(Continued)

(56) References Cited

U.S. PATENT DOCUMENTS 6,473,678 B1 * 10/2002 Satoh ...................... B62D 1/28
180/168
10,379,538 B1 * 8/2019 Sheckells ........... B60W 60/0011
(Continued)

FOREIGN PATENT DOCUMENTS

CN 101093396 A 12/2007
CN 102358287 A * 2/2012 ........... B62D 15/025
(Continued)

OTHER PUBLICATIONS

Xiong, Zhonggang et al:"Design of Vehicle Path Tracking Control Software System Based on Path Curvature Dynamic Preview Search Algorithm", Jiangsu Agricultural Sciences, Feb. 28, 2015 (Feb. 28, 2015), vol. 43, No. 2, pp. 370-373.
(Continued)

*Primary Examiner* — Fadey S. Jabr
*Assistant Examiner* — Mohamed Abdo Algehaim
(74) *Attorney, Agent, or Firm* — ScienBiziP, P.C.

(57) ABSTRACT

Provided is a method for controlling movement of an autonomous mobile machine. The method includes that: a target path and a current state of the autonomous mobile machine are acquired; at least one preview distance is calculated according to a current speed; at least one preview point each corresponding to a respective one of the at least
(Continued)

one preview distance is acquired according to the target path and the at least one preview distance; a lateral deviation from each preview point to a current position is calculated; a direction control angle parameter of a current control period is acquired according to the lateral deviation, the current speed and a preset parameter matching table; and the autonomous mobile machine is controlled to move according to the direction control angle parameter. Also provided are an apparatus for controlling movement of an autonomous mobile machine, a machine and a storage medium.

15 Claims, 3 Drawing Sheets

(58) Field of Classification Search
CPC ... B60W 2050/0026; B60W 2050/006; B60W 2520/10; B60W 2556/50
USPC .......................................................... 701/25
See application file for complete search history.

(56) References Cited

U.S. PATENT DOCUMENTS

| | | | |
|---|---|---|---|
| 11,318,936 B2* | 5/2022 | Giorelli | G05D 1/0212 |
| 2005/0240334 A1 | 10/2005 | Matsumoto et al. | |
| 2008/0088707 A1* | 4/2008 | Iwaki | G01S 13/931 |
| | | | 348/208.1 |
| 2010/0256836 A1* | 10/2010 | Mudalige | G08G 1/164 |
| | | | 701/2 |
| 2011/0098922 A1* | 4/2011 | Ibrahim | B60W 50/10 |
| | | | 701/532 |
| 2014/0236473 A1* | 8/2014 | Kondo | G01C 21/3647 |
| | | | 701/400 |
| 2016/0052544 A1* | 2/2016 | Ueda | B62D 15/025 |
| | | | 701/25 |
| 2017/0057545 A1* | 3/2017 | Laur | B62D 15/0265 |
| 2017/0115662 A1* | 4/2017 | Mori | B60W 10/04 |
| 2017/0361848 A1* | 12/2017 | Noto | B60W 50/0097 |
| 2018/0086340 A1* | 3/2018 | Nagatsuka | B60W 30/0953 |
| 2018/0188739 A1* | 7/2018 | Tseng | B60W 30/12 |
| 2018/0345978 A1* | 12/2018 | Fujii | B60W 30/18163 |
| 2018/0354513 A1* | 12/2018 | Moshchuk | G05D 1/0229 |
| 2019/0135279 A1* | 5/2019 | Irie | B60W 30/10 |
| 2019/0193731 A1* | 6/2019 | Irie | G08G 1/167 |
| 2019/0276016 A1* | 9/2019 | Giorelli | B60W 40/13 |
| 2019/0359188 A1* | 11/2019 | Yamada | B60T 8/88 |
| 2020/0010088 A1* | 1/2020 | Kokaki | B60W 30/188 |
| 2020/0156639 A1* | 5/2020 | Liu | B60W 40/105 |
| 2020/0341476 A1* | 10/2020 | Wuthishuwong | G08G 1/167 |
| 2022/0153265 A1* | 5/2022 | Kim | B62D 15/025 |

FOREIGN PATENT DOCUMENTS

| | | | |
|---|---|---|---|
| CN | 102358287 A | | 2/2012 |
| CN | 104571112 A | * | 4/2015 |
| CN | 105676643 A | | 6/2016 |
| CN | 107085424 A | | 8/2017 |
| CN | 107153420 A | | 9/2017 |
| CN | 107292048 A | | 10/2017 |
| CN | 107428337 A | | 12/2017 |

OTHER PUBLICATIONS

Li, Linhui et al:"Fuzzy sliding mode lateral control of intelligent vehicle based on vision", Journal of Dalian University of Technology, May 31, 2013 (May 31, 2013), vol. 53, No. 5, pp. 735-741.

* cited by examiner

METHOD AND APPARATUS FOR CONTROLLING MOVEMENT OF AUTONOMOUS MOBILE MACHINE, MACHINE, AND STORAGE MEDIUM

TECHNICAL FIELD

The present disclosure relates to the technical field of autonomous movement, and more particularly to a method and apparatus for controlling movement of an autonomous mobile machine, a machine, and a storage medium.

BACKGROUND

With the development of science and technology, smart devices such as smart automobiles and smart mobile robots are developing rapidly. A pilotless automobile is one type of smart automobiles. The goal of unmanned driving is mainly achieved by a computer-based smart pilot in the automobile. In related technologies, a method for realizing unmanned vehicle driving includes: calculating a turning curvature of a vehicle, and acquiring a direction control angle value according to the turning curvature. Another method includes: extracting behavioral characteristic data and manipulation rules of a driver according to multi-source information such as driver manipulation, vehicle status and road environment under different driving conditions, using a database to acquire output steering directly from input vehicle speed information, or acquire target vehicle speed information directly from input steering information.

However, in a process of implementing the scheme of the present disclosure, the inventors have found that the first method needs to perform a series of complicated algorithms to calculate the direction control angle value, resulting in low calculation efficiency; and the second method needs to collect a large amount of data for analysis, and the control process is a black box, which cannot be corrected or debugged, thereby reducing the stability and accuracy of vehicle control.

SUMMARY

In view of the above problem, the embodiments of the present disclosure to provide a method and apparatus for controlling movement of an autonomous mobile machine, a machine, and a storage medium, which can quickly acquire a suitable direction control angle parameter corresponding to a current speed according to a parameter matching table, thereby improving the calculation speed and efficiency. In addition, parameters in the parameter matching table can be adjusted according to actual conditions to make machine control more stable and accurate.

A first embodiment of the present disclosure provides a method for controlling movement of an autonomous mobile machine. The method may include the following operations.

A target path and a current state of the autonomous mobile machine are acquired, wherein the current state includes a current speed and a current position.

At least one preview distance is calculated according to the current speed.

At least one preview point each corresponding to a respective one of the at least one preview distance is acquired according to the target path and the at least one preview distance.

A lateral deviation from each preview point to the current position is calculated, wherein the lateral deviation is a vertical distance from the preview point to a current moving heading of the autonomous mobile machine.

A direction control angle parameter of a current control period is acquired according to the lateral deviation, the current speed and a preset parameter matching table, wherein the preset parameter matching table defines a direction control angle parameter of the autonomous mobile machine under a specific lateral deviation at a specific speed.

The autonomous mobile machine is controlled to move according to the direction control angle parameter.

In at least one exemplary implementation of the first embodiment, before the target path and the current state of the autonomous mobile machine are acquired, the method may further include the following operations.

All first direction control angle parameters of the autonomous mobile machine under different lateral deviations at a specific speed are acquired.

All second direction control angle parameters of the autonomous mobile machine under a specific lateral deviation at different speeds are acquired.

The parameter matching table is generated according to all the first direction control angle parameters and all the second direction control angle parameters.

In at least one exemplary implementation of the first embodiment, before the at least one preview distance is calculated according to the current speed, the method may further include the following operations.

A tracking coordinate system is established according to the target path and the current state.

A current coordinate of the autonomous mobile machine is acquired according to the current position and the tracking coordinate system.

The operation that the lateral deviation from each preview point to the current position is calculated may include the following operations.

A preview coordinate of each preview point is calculated according to the tracking coordinate system.

The lateral deviation from each preview point to the current position is calculated according to the current coordinate and the preview coordinate.

In at least one exemplary implementation of the first embodiment, there may be a plurality of path points on the target path. The operation that the at least one preview point each corresponding to the respective one of the at least one preview distance is acquired according to the target path and the at least one preview distance may include the following operations.

For each preview distance:

A distance between each path point and the current position is calculated, and a path point having a smallest distance is taken as a closest point.

A distance from each path point to the current position is acquired starting from the closest point according to a sequence of the plurality of path points in the target path, until a first path point which is spaced apart from the current position by a distance greater than or equal to the preview distance is acquired for the first time.

A previous path point of the first path point is selected as a second path point according to the target path.

Interpolation processing at a preset interval is performed between the first path point and the second path point to acquire an interpolation point set.

The preview point corresponding to the preview distance is acquired according to the preview distance and the interpolation point set.

In at least one exemplary implementation of the first embodiment, the preview distance may include a remote preview distance and a near preview distance, wherein the remote preview distance is a distance calculated based on the current speed and a preset remote preview time.

In at least one exemplary implementation of the first embodiment, the operation that the direction control angle parameter of the current control period is acquired according to the lateral deviation, the current speed and the preset parameter matching table may include the following operations.

It is judged whether there is an item, which contains a lateral deviation and a speed simultaneously matching the lateral deviation and the current speed, in the preset parameter matching table.

In a case where there is such an item, a direction control angle parameter corresponding to the item is extracted from the parameter matching table.

In a case where there is no such item, the lateral deviation and the speed are calculated by linear interpolation according to the preset parameter matching table to acquire the direction control angle parameter for the current control period.

In at least one exemplary implementation of the first embodiment, the operation that the autonomous mobile machine is controlled to move according to the direction control angle parameter may include the following operations.

A control parameter corresponding to each preview point for the current control period is calculated according to the direction control angle parameter, the lateral deviation and the current speed.

A target direction control angle control amount for the current control period is calculated according to the lateral deviation and the control parameter of each preview point.

The autonomous mobile machine is controlled to move according to the target direction control angle control amount.

In at least one exemplary implementation of the first embodiment, the operation that the control parameter corresponding to each preview point for the current control period is calculated according to the direction control angle parameter, the lateral deviation and the current speed may include the following operations.

A proportional parameter corresponding to each preview point for the current control period is calculated according to the direction control angle parameter and the lateral deviation.

An integral parameter and a differential parameter corresponding to each preview point for the current control period are acquired according to the current speed.

In at least one exemplary implementation of the first embodiment, there may be at least two preview points, and the operation that the target direction control angle control amount is calculated according to the lateral deviation and the control parameter of each preview point may include the following operations.

A control output of each preview point is calculated according to the lateral deviation and the control parameter of each preview point.

Each control output is weighted to acquire a direction control angle control amount.

Amplitude limiting is performed on the direction control angle control amount to acquire the target direction control angle control amount for the current control period.

In at least one exemplary implementation of the first embodiment, the method may further include that: a historical lateral deviation, which corresponds to each preview point in the current control period, in previous N control periods is acquired in a case where the current control period is not the first control period.

The operation that the control output of each preview point is calculated according to the lateral deviation and the control parameter of each preview point may include the following operation.

The control output of each preview point is calculated according to the control parameter of each preview point, the lateral deviation and the historical lateral deviation.

A second embodiment provides an apparatus for controlling movement of an autonomous mobile machine. The apparatus may include:

a data acquisition module, configured to acquire a target path and a current state of the autonomous mobile machine, wherein the current state includes a current speed and a current position;

a preview distance calculation module, configured to calculate at least one preview distance according to the current speed;

a preview point acquisition module, configured to acquire at least one preview point each corresponding to a respective one of the at least one preview distance according to the target path and the at least one preview distance;

a lateral deviation calculation module, configured to calculate a lateral deviation from each preview point to the current position, wherein the lateral deviation is a vertical distance from the preview point to a current moving heading of the autonomous mobile machine;

a direction control angle parameter acquisition module, configured to acquire a direction control angle parameter of a current control period according to the lateral deviation, the current speed and a preset parameter matching table, wherein the preset parameter matching table defines a direction control angle parameter of the autonomous mobile machine under a specific lateral deviation at a specific speed; and a movement control module, configured to control the autonomous mobile machine to move according to the direction control angle parameter.

A third embodiment of the present disclosure provides an autonomous mobile machine, which may include a machine body and a controller, wherein the controller includes a processor, a memory and a computer program that is stored in the memory and configured to be executed by the processor, and when the processor executes the computer program, the method for controlling movement of an autonomous mobile machine according to any one of the above is implemented.

A fourth embodiment the present disclosure provides a computer readable storage medium, which may include a stored computer program, wherein when the computer program is run, a device where the computer readable storage medium is located is controlled to execute the method for controlling movement of an autonomous mobile machine according to any one of the above.

Some of the foregoing technical solutions have the following advantages: a suitable direction control angle parameter corresponding to a current speed can be quickly acquired according to a parameter matching table, and the calculation efficiency is improved. In addition, parameters in the parameter matching table can be adjusted according to actual conditions to make machine control more stable and accurate. Moreover, a direction control angle control amount is calculated according to the direction control angle parameter so as to control an autonomous mobile machine (such as a pilotless automobile or a smart mobile robot) to smoothly and stably move under different working conditions such as turning, steering and turning around. Lateral control and longitudinal control is coupled by acquiring a relationship with a directional control angle under different vehicle speeds and different lateral deviations, thereby improving the accuracy and stability. Of course, implementing any of the products of the embodiments of the present disclosure does not necessarily require all of the advantages described above to be achieved at the same time.

BRIEF DESCRIPTION OF THE DRAWINGS

In order to more clearly illustrate the technical solutions of the present disclosure, the drawings used in the implementations will be briefly described below. It is apparent that the drawings in the following description are only some implementations of the present disclosure, and other drawings can be acquired from those skilled in the art according to these drawings without any creative work.

DETAILED DESCRIPTION OF THE EMBODIMENTS

The technical solutions in the embodiments of the present disclosure will be clearly and completely described hereinbelow with the drawings in the embodiments of the present disclosure. It is apparent that the described embodiments are only part of the embodiments of the present disclosure, not all of the embodiments. On the basis of the embodiments of the present disclosure, all other embodiments acquired on the premise of no creative work of those of ordinary skill in the art fall within the scope of protection of the present disclosure.

The present disclosure provides a method and apparatus for controlling movement of an autonomous mobile machine, an autonomous mobile machine and a storage medium. The method and the apparatus are used for controlling the movement of the autonomous mobile machine, so that the autonomous mobile machine is controlled to accurately move without external artificial control. The following is a detailed description.

The autonomous mobile machine may be a self-moving or moving machine such as a smart automobile, a pilotless automobile, a smart robot or an autonomous mobile robot. For ease of understanding, the following embodiments illustrate a pilotless automobile as an example. However, it should be understood that other machines having autonomous mobility are also within the scope of the present disclosure.

Figure 1:
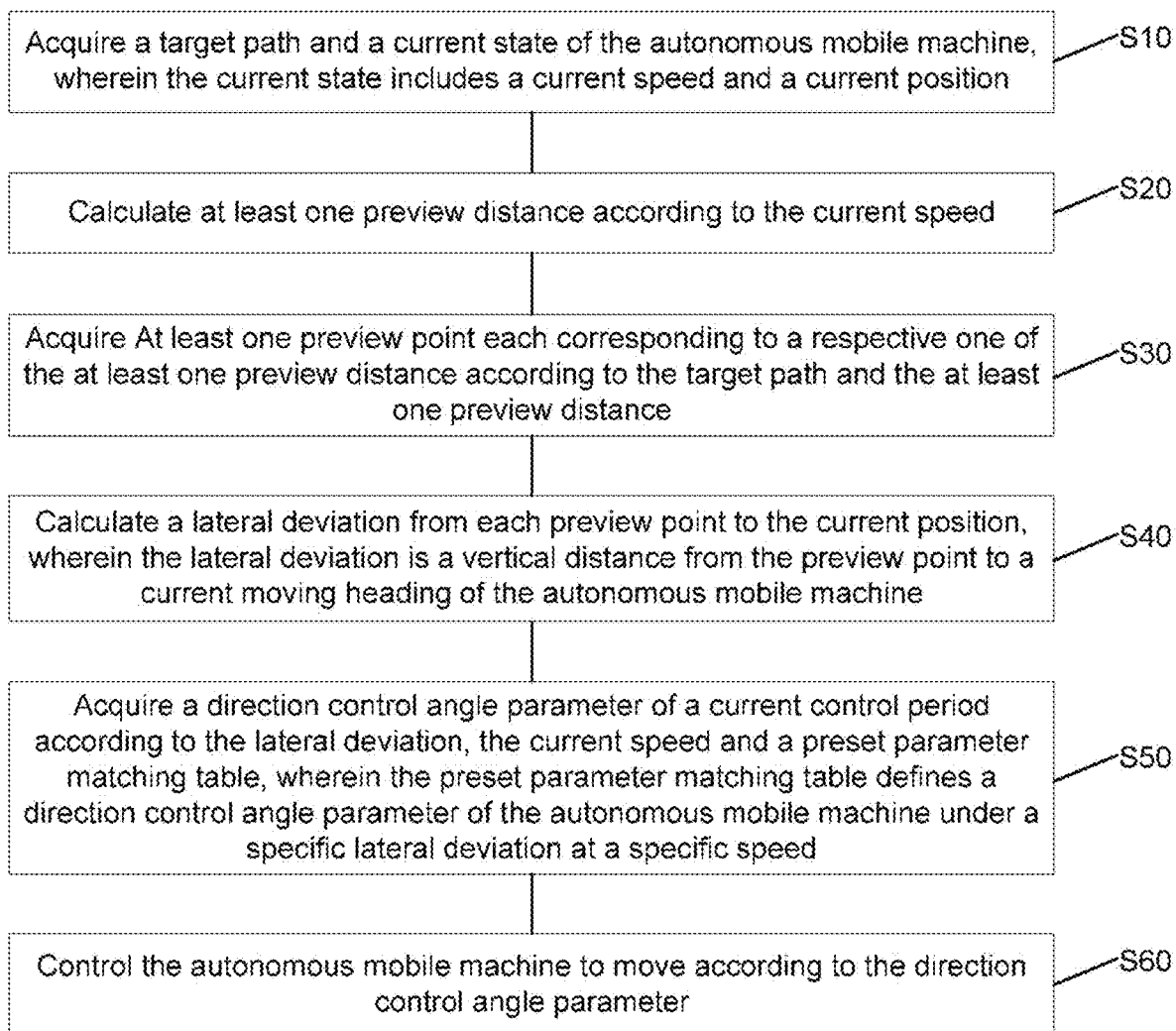
FIG. 1 is a schematic flowchart of a method for controlling movement of an autonomous mobile machine according to a first embodiment of the present disclosure.

Referring to FIG. 1, a first embodiment of the present disclosure provides a method for controlling movement of an autonomous mobile machine, which may be executed on an autonomous mobile machine and includes the following operations.

At S10, a target path and a current state of the autonomous mobile machine are acquired, wherein the current state includes a current speed and a current position.

In the present embodiment, 0.1 s is taken as a control period, and a specified target path is acquired at the beginning of the present control period (current control period). The target path includes at least one path point including latitude and longitude information, and before vehicle movement is controlled, a target path is preset and stored in a control module or an industrial personal computer of the pilotless automobile, in order to quickly acquire the needed target path during the control of vehicle movement. At the beginning of the present control period, it is also suggested to acquire current state information of the vehicle, where the current state information includes a current vehicle speed of the vehicle and a current position of the vehicle. A Global Positioning System (GPS) can be used to acquire the current position and current speed of the vehicle. The current heading of the vehicle (current driving direction) may also be acquired.

At S20, at least one preview distance is calculated according to the current speed.

At S30, at least one preview point each corresponding to a respective one of the at least one preview distance is acquired according to the target path and the at least one preview distance.

In the present embodiment, the number of preview distances that need to be calculated may be determined according to actual conditions, and the preview distance is calculated according to the current speed of the vehicle. For example, a preview time is set for each preview distance, and the preview time is multiplied by the current speed to acquire a preview distance. As an exemplary implementation of the present embodiment, the preview distance includes a remote preview distance and a near preview distance. As an example, a remote preview time corresponding to a specified remote preview distance d1 is 2 s, and the current speed of the vehicle is (for example, the current vehicle speed is 10 m/s) multiplied by the remote preview time (2 s) to calculate the remote preview distance d1. Here, it is suggested to set the upper limit of d1 to 25 m. Of course, a near preview time can also be specified in advance to calculate the near preview distance. In the present embodiment, the near preview distance d2 is selected to be 3 m in front of the vehicle, and the value is a better control effect value acquired through experiments.

In the present embodiment, a preview point is selected according to the calculated preview distance and the target path. As an example, a target point (path point) is sequentially selected according to the target path. The target point should be in front of the vehicle. It is suggested to judge whether the distance between the target point and the vehicle is beyond the corresponding preview distance, if the distance between the target point and the vehicle is smaller than the preview distance, the target point is discarded and a next target point is selected. If the distance between the target point and the vehicle is not smaller than the preview distance, the target point is used as the preview point corresponding to the preview distance, and the preview point is not used to calculate or judge a target point behind the preview point. In the present embodiment, a remote preview point is calculated according to the remote preview distance, and a near preview point is calculated according to the near preview distance.

At S40, a lateral deviation from each preview point to the current position is calculated. The lateral deviation is a vertical distance from the preview point to a current moving heading of the autonomous mobile machine.

In the present embodiment, calculating a lateral deviation from a preview point to the current position of the vehicle refers to: calculating a vertical distance from the preview point to a current moving heading of the vehicle, wherein the current moving heading of the vehicle is a current driving direction (speed direction) of the vehicle; here, the lateral deviation of each preview point to the current position of the vehicle can be calculated by a trigonometric function. In the present embodiment, the lateral deviation of the remote preview point and the lateral deviation of the near preview point are respectively calculated according to the remote preview point and the near preview point.

In an implementation of the present embodiment, the lateral deviation may be calculated by establishing a tracking coordinate system. Specifically, after the target path and the current state of the vehicle are acquired, a tracking coordinate system is established according to the target path and the current state, and a current coordinate of the autonomous mobile machine is acquired according to the current position and the tracking coordinate system. As an example, a coordinate origin of the GPS may be used as an origin, an x axis and a y axis may be determined according to the target path and the current state of the vehicle, and a tracking coordinate system may be established, so that a current coordinate of the vehicle (x0, y0) may be calculated on the tracking coordinate system according to the current position of the vehicle. Therefore, the lateral deviation from each preview point to the current position of the vehicle may be quickly calculated. Specifically, a preview coordinate of each preview point is calculated according to the tracking coordinate system, and the lateral deviation from each preview point to the current position is calculated according to the current coordinate and the preview coordinate. As an example, the remote preview coordinate (xA, yA) is calculated according to the position of the remote preview point on the tracking coordinate system, then the lateral deviation of the remote preview point is calculated according to the current coordinate (x0, y0) and the remote preview coordinate (xA, yA), and the lateral deviation of the near preview point can be calculated in the same way.

At S50, a direction control angle parameter of a current control period is acquired according to the lateral deviation, the current speed and a preset parameter matching table, wherein the preset parameter matching table defines a direction control angle parameter of the autonomous mobile machine under a specific lateral deviation at a specific speed.

At S60, the autonomous mobile machine is controlled to move according to the direction control angle parameter.

In the present embodiment, a parameter matching table needs to be preset, where a direction control angle parameter of the autonomous mobile machine (such as a pilotless automobile) under different speeds and different lateral deviations is calibrated by an engineering method, and a parameter match table is generated. When running online, the above parameter matching table is queried according to the current speed and the lateral deviation to acquire the corresponding direction control angle parameter at this time. For example, according to the current speed and the lateral deviation of the remote preview point, the above table is queried to acquire a direction control angle parameter corresponding to the remote preview point; according to the current speed and the lateral deviation of the near preview point, the above table is queried to acquire a directional control angle parameter corresponding to the near preview point. It can be understood that in a pilotless automobile, the direction control angle parameter is a steering wheel angle parameter.

In the present embodiment, a direction control angle control amount is calculated according to all the acquired direction control angle parameters, and the direction control angle control amount (i.e., a steering wheel angle control amount of a current control period of the vehicle) is output to a control execution system of the machine, so that the execution system can adjust a direction control rotation angle of the vehicle according to the direction control angle control amount, and the vehicle can drive according to the specified target path, and thus does not deviate from the path.

In conclusion, a suitable direction control angle parameter corresponding to a current speed can be quickly acquired according to a parameter matching table, and the calculation efficiency is improved. In addition, parameters in the parameter matching table can be adjusted according to actual conditions to make machine control more stable and accurate. Moreover, a direction control angle control amount is calculated according to the direction control angle parameter so as to control an autonomous mobile machine (such as a pilotless automobile or a smart mobile robot) to smoothly and stably move under different working conditions such as turning, steering and turning around.

Second Embodiment of the Present Disclosure

On the basis of the first embodiment, before operation S10, the method further includes the following operations.

All first direction control angle parameters of the autonomous mobile machine under different lateral deviations at a specific speed are acquired, all second direction control angle parameters of the autonomous mobile machine under a specific lateral deviation at different speeds are acquired, and the parameter matching table is generated according to all the first direction control angle parameters and all the second direction control angle parameters.

In the present embodiment, as an example, a suitable direction control angle parameter under different lateral deviations at a specific vehicle speed is calibrated by manual calibration or engineering method, and a suitable direction control angle parameter at different vehicle speeds under a specific lateral deviation is further calibrated. For example, when the vehicle speed is 15 m/s, a direction control angle value under different lateral deviations is recorded; and when the vehicle speed is 20 m/s, a direction control angle value under different lateral deviations is recorded. Finally, all the suitable direction control angle parameters calibrated under the above conditions are acquired, and coupled to generate a parameter matching table of vehicle speed-lateral deviation-direction control angle parameter.

In the present embodiment, the direction control angle parameter may be quickly acquired according to the generated parameter matching table. Specifically, it is judged whether there is an item, which contains a lateral deviation and a speed simultaneously matching the lateral deviation and the current speed, in the preset parameter matching table. In a case where there is such an item, a direction control angle parameter corresponding to the item is extracted from the parameter matching table. In a case where there is no such item, the lateral deviation and the speed are calculated by linear interpolation according to the preset parameter matching table to acquire the direction control angle parameter for the current control period.

In the present embodiment, as an example, it is assumed that the current vehicle speed of the pilotless automobile is V and the lateral deviation of a first preview point is D, it is judged whether the parameter matching table has an item with a vehicle speed and a lateral deviation simultaneously matching the vehicle speed V and the lateral deviation D, in a case where there is such an item, a direction control angle parameter corresponding to the vehicle speed V and the lateral deviation D is directly extracted from the parameter matching table; and in a case where there is no such item, the direction control angle parameter for the current control period corresponding to the vehicle speed V and the lateral direction D is calculated by linear interpolation.

In the above manner, lateral control and longitudinal control is coupled by acquiring a relationship with a directional control angle under different vehicle speeds and different lateral deviations, and complete direction control angle parameters covering all conditions may be acquired by linear interpolation, thereby improving the accuracy and stability; and calibration is performed based on a physical quantity, and the parameters are adjustable, which is convenient for staff to debug.

Third Embodiment of the Present Disclosure

On the basis of the first embodiment, the method further includes the following operations.

There may be a plurality of path points on the target path. The operation that at least one preview point each corresponding to a respective one of the at least one preview distance is acquired according to the target path and the at least one preview distance includes the following operations. For each preview distance:

A distance between each path point and the current position is calculated, and a path point having a smallest distance is taken as a closest point.

A distance from each path point to the current position is acquired starting from the closest point according to a sequence of the plurality of path points in the target path, until a first path point which is spaced apart from the current position by a distance greater than or equal to the preview distance is acquired for the first time.

A previous path point of the first path point is selected as a second path point according to the target path.

Interpolation processing at a preset interval is performed between the first path point and the second path point to acquire an interpolation point set.

The preview point corresponding to the preview distance is acquired according to the preview distance and the interpolation point set.

Figure 2:
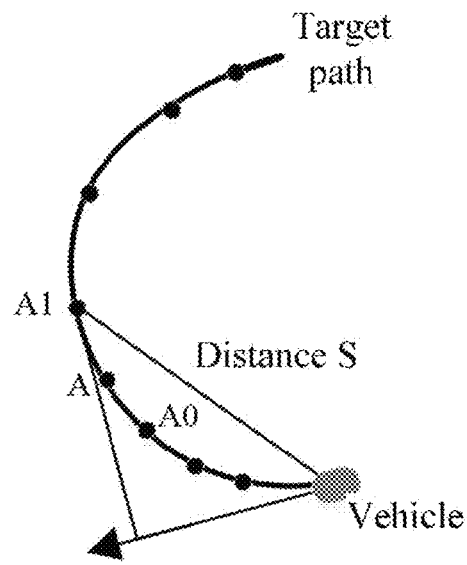
FIG. 2 is a schematic diagram of selecting a remote preview point in a method for controlling movement of an autonomous mobile machine according to a third embodiment of the present disclosure.

In the present embodiment, as an example, the preview distance includes a remote preview distance and a near preview distance. For a remote preview distance d1, as shown in FIG. 2, the direction of an arrow in the figure is a current driving direction of the vehicle. In the first operation, a distance s from each path point in the target path to the current position of the vehicle is calculated, and a path point with the smallest distance from the vehicle in all the path points is taken as a closest point P0; according to a sequence of the plurality of path points in the target path, the distance s calculated above is acquired starting from the closest point, it is judged whether s is greater than or equal to d1, if s is not greater than or equal to d1, the point is discarded and a next path point is acquired to make the same judgment until s is greater than or equal to d1, and the path point (the path point of which s is greater than or equal to d1, acquired for the first time) is taken as a remote preview initial path point A1. In the second operation, a previous point A0 of the path point A1 in the target path is selected to perform interpolation at a preset interval (the preset interval may be 5 cm), an interpolation point set X is acquired, calculation is performed in the interpolation point set X according to the method in the first operation, and a remote preview point A corresponding to the remote preview distance d1 is acquired. Similarly, the near preview distance is calculated by using the same method to acquire a near preview point. Here, it can be understood that the selected preview points are located in front of the vehicle, and the path points located behind the vehicle do not need to be calculated.

In the above manner, the corresponding preview point is acquired according to each preview distance, it is ensured that the calculated position of the preview point is in front of the autonomous mobile machine (such as a pilotless automobile), and jumping caused by an excessive interval between the preview point and the current position is avoided, thereby ensuring that oscillation due to small jitter near the target path is avoided during the high-speed motion.

Fourth Embodiment of the Present Disclosure

On the basis of the first embodiment, the operation that the autonomous mobile machine is controlled to move according to the direction control angle parameter includes the following operations.

At S61, a control parameter corresponding to each preview point for the current control period is calculated according to the direction control angle parameter, the lateral deviation and the current speed.

In the present embodiment, a Proportional-Differential-Integral (PID) controller is designed to calculate a control amount, so it is suggested to first determine control parameters. Specifically, a proportional parameter corresponding to each preview point for the current control period is calculated according to the direction control angle parameter and the lateral deviation, and an integral parameter and a differential parameter corresponding to each preview point for the current control period are acquired according to the current speed. As an example, when a direction control angle parameter corresponding to a lateral deviation of a specific preview point is acquired, an expression proportional parameter is calculated by dividing the direction control angle parameter by the lateral deviation, so as to acquire a proportional parameter value corresponding to each preview point, and an integral parameter value and a differential parameter value corresponding to each preview point are adjusted according to the current state of the vehicle. Here, the values of the respective control parameters may be appropriately adjusted. For example, when the current speed does not reach a predetermined vehicle speed, the integral parameters of specific specified preview points can be set to zero, and so on.

At S62, a target direction control angle control amount for the current control period is calculated according to the lateral deviation and the control parameter of each preview point.

Figure 3:
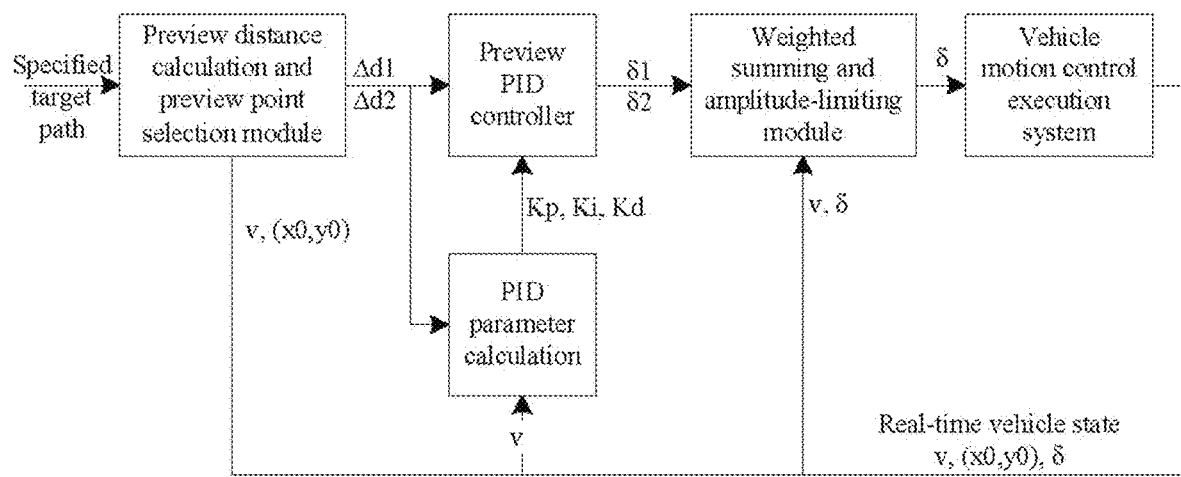
FIG. 3 is a schematic flowchart of a control system of a method for controlling movement of an autonomous mobile machine according to a fourth embodiment of the present disclosure.

In the present embodiment, referring to FIG. 3, FIG. 3 is a flowchart of a control system in the present embodiment. The calculated control parameters (proportional parameters, differential parameters and integral parameters) and lateral deviation are input into a PID controller, so that the target direction control angle control amount for the current control period can be calculated, wherein the PID controller is an automatic controller with feedback.

In the present embodiment, when there are at least two preview points, specifically, a control output of each preview point is calculated according to the lateral deviation and the control parameter of each preview point, each control output is weighted to acquire a direction control angle control amount, and amplitude limiting is performed on the direction control angle control amount to acquire the target direction control angle control amount for the current control period. Moreover, a historical lateral deviation, which corresponds to each preview point in the current control period, in previous N control periods is acquired in a case where the current control period is not the first control period, and the operation that the control output of each preview point is calculated according to the lateral deviation and the control parameter of each preview point includes the following operation. The control output of each preview point is calculated according to the control parameter of each preview point, the lateral deviation and the historical lateral deviation.

In the present embodiment, as an exemplary implementation, the correlation calculation in the current control period is performed according to the lateral deviation of each preview point in the previous control period and the direction control angle control amount or the like. As an example, as shown in FIG. 3, the preview points are a remote preview point and a near preview point; a proportional parameter Kp1 and a differential parameter Kd1 corresponding to the remote preview point are calculated by the above method, and a proportional parameter Kp2, a differential parameter Kd2 and an integral parameter Ki2 corresponding to the near preview point are also calculated; then, a remote preview control output $\delta1$ and a near preview control output $\delta2$ are respectively calculated by the PID control.

$$\delta1 = Kp1 \cdot \Delta d1 + Kd1 \cdot (\Delta d1 - \Delta d1')$$

$$\delta2 = Kp2 \cdot \Delta d2 + |Ki2 \cdot \Delta d2 + Kd2 \cdot (\Delta d2 - \Delta d2')$$

where $\Delta d1'$ is a lateral error of a remote preview point in the previous control period, and $\Delta d2'$ is a lateral error of a near preview point in the previous control period.

Then, the two calculated control outputs are weighted and summed to acquire a direction control angle control amount $\delta$ not amplitude limited.

$$\delta = a1 \cdot \delta1 + a2 \cdot \delta2$$

where A1 is the weight of a remote preview control output of a current control period, and a2 is the weight of a near preview control output of a current control period. Generally, a1=a2=1.

Finally, in order to prevent the direction control angle control amount from being too large or too small, it is suggested to perform amplitude limiting on the target direction control angle control amount according to the current speed of the vehicle, etc., to finally acquire the target direction control angle control amount.

$$\begin{cases} \delta = \delta\max, & \delta > \delta\max \\ \delta = \delta\min, & \delta < \delta\min \end{cases}$$

Moreover, it is also suggested to ensure the following condition to be satiated:

$$\begin{cases} \delta - \delta' = \Delta\delta\max, & \delta - \delta' > \Delta\delta\max \\ \delta - \delta' = -\Delta\delta\max, & \delta - \delta' < -\Delta\delta\max \end{cases}$$

where $\delta$ is a direction control angle control amount of a current control period, $\delta'$ is a direction control angle control amount of a previous control period, $\delta\max$ is a preset maximum control amount, $\delta\min$ is a preset minimum control amount, and $\Delta\delta\max$ is a preset maximum amount of error, where $\Delta\delta\max$ is related to the current vehicle speed and the current control period.

At S63, the autonomous mobile machine is controlled to move according to the target direction control angle control amount.

In the present embodiment, the direction control angle control amount is output to a control execution system of the machine, so that the execution system can adjust a direction control rotation angle of the vehicle according to the direction control angle control amount, and the vehicle can drive according to the specified target path, and thus does not deviate from the path.

In the above manner, the direction control angle control amount required for the current control period can be acquired by the weighting process, and the control amount is subjected to amplitude limiting to prevent the control amount from being too large, thereby preventing the machine from being out of control when the vehicle is sharply turned at a high speed, and improving the stability of machine movement or motion.

Figure 4:
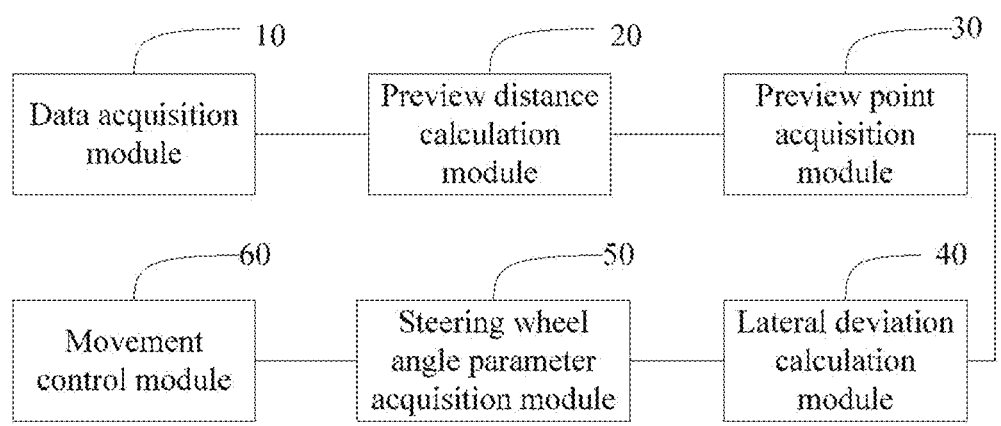
FIG. 4 is a schematic structure diagram of an apparatus for controlling movement of an autonomous mobile machine according to a fifth embodiment of the present disclosure.

Referring to FIG. 4, a fifth embodiment of the present disclosure also provides an apparatus for controlling movement of an autonomous mobile machine. The apparatus includes a data acquisition module 10, a preview distance calculation module 20, a preview point acquisition module 30, a lateral deviation calculation module 40, a direction control angle parameter acquisition module 50, and a movement control module 60.

The data acquisition module 10 is configured to acquire a target path and a current state of the autonomous mobile machine, wherein the current state includes a current speed and a current position.

The preview distance calculation module 20 is configured to calculate at least one preview distance according to the current speed.

The preview point acquisition module 30 is configured to acquire at least one preview point each corresponding to a respective one of the at least one preview distance according to the target path and the at least one preview distance.

The lateral deviation calculation module 40 is configured to calculate a lateral deviation from each preview point to the current position, wherein the lateral deviation is a vertical distance from the preview point to a current moving heading of the autonomous mobile machine.

The direction control angle parameter acquisition module 50 is configured to acquire a direction control angle parameter of a current control period according to the lateral deviation, the current speed and a preset parameter matching table, wherein the preset parameter matching table defines a direction control angle parameter of the autonomous mobile machine under a specific lateral deviation at a specific speed.

The movement control module 60 is configured to control the autonomous mobile machine to move according to the direction control angle parameter.

Further, the apparatus for controlling the movement of an autonomous mobile machine further includes a first data acquisition unit, a second data acquisition unit and a matching table generation unit.

The first data acquisition unit is configured to acquire all first direction control angle parameters of the autonomous mobile machine under different lateral deviations at a specific speed.

The second data acquisition unit is configured to acquire all second direction control angle parameters of the autonomous mobile machine under a specific lateral deviation at different speeds.

The matching table generation unit is configured to generate the parameter matching table according to all the first direction control angle parameters and all the second direction control angle parameters.

In an exemplary embodiment, the apparatus for controlling the movement of an autonomous mobile machine further includes a coordinate system establishment unit and a current coordinate calculation unit.

The coordinate system establishment unit is configured to establish a tracking coordinate system according to the target path and the current state.

The current coordinate calculation unit is configured to acquire a current coordinate of the autonomous mobile machine according to the current position and the tracking coordinate system.

The lateral deviation calculation module 40 includes a preview coordinate calculation unit and a lateral deviation calculation unit.

The preview coordinate calculation unit is configured to calculate a preview coordinate of each preview point according to the tracking coordinate system.

The lateral deviation calculation unit is configured to calculate the lateral deviation from each preview point to the current position according to the current coordinate and the preview coordinate, wherein the lateral deviation is a vertical distance from the preview point to a current moving heading of the autonomous mobile machine.

In an exemplary embodiment, there may be a plurality of path points on the target path, and the preview point acquisition module 30 includes a closest point determination unit, a first path point selection unit, a second path point selection unit, an interpolation processing unit and a preview point acquisition unit.

For each preview distance:

The closest point determination unit is configured to calculate a distance between each path point and the current position, and take a path point having a smallest distance as a closest point.

The first path point selection unit is configured to acquire, starting from the closest point, a distance from each path point to the current position according to a sequence of the plurality of path points in the target path, until a first path point which is spaced apart from the current position by a distance greater than or equal to the preview distance is acquired for the first time.

The second path point selection unit is configured to select a previous path point of the first path point as a second path point according to the target path.

The interpolation processing unit is configured to perform interpolation processing at a preset interval between the first path point and the second path point to acquire an interpolation point set.

The preview point acquisition unit is configured to acquire the preview point corresponding to the preview distance according to the preview distance and the interpolation point set.

Further, the preview distance includes a remote preview distance and a near preview distance, wherein the remote preview distance is a distance calculated based on the current speed and a preset remote preview time.

In an exemplary embodiment, the direction control angle parameter acquisition module 50 includes a judgment unit, an extraction unit and a linear calculation unit.

The judgment unit is configured to judge whether there is an item, which contains a lateral deviation and a speed simultaneously matching the lateral deviation and the current speed, in the preset parameter matching table.

The extraction unit is configured to extract, in a case where there is such an item, a direction control angle parameter corresponding to the item from the parameter matching table.

The linear calculation unit is configured to calculate, in a case where there is no such item, the lateral deviation and the speed by linear interpolation according to the preset parameter matching table to acquire the direction control angle parameter for the current control period.

In an exemplary embodiment, the movement control module 60 includes a control parameter calculation unit, a target control amount calculation unit and a movement control unit.

The control parameter calculation unit is configured to calculate a control parameter corresponding to each preview point for the current control period according to the direction control angle parameter, the lateral deviation and the current speed.

The target control amount calculation unit is configured to calculate a target direction control angle control amount for the current control period according to the lateral deviation and the control parameter of each preview point.

The movement control unit is configured to control the autonomous mobile machine to move according to the target direction control angle control amount.

Further, the control parameter calculation unit includes a first parameter calculation unit and a second parameter calculation unit.

The first parameter calculation unit is configured to calculate a proportional parameter corresponding to each preview point for the current control period according to the direction control angle parameter and the lateral deviation.

The second parameter calculation unit is configured to acquire an integral parameter and a differential parameter corresponding to each preview point for the current control period according to the current speed.

In an exemplary embodiment, there are at least two preview points, and the target control amount calculation unit includes an output calculation unit, a weighting calculation unit and an amplitude limiting unit.

The output calculation unit is configured to calculate a control output of each preview point according to the lateral deviation and the control parameter of each preview point.

The weighting calculation unit is configured to weight each control output to acquire a direction control angle control amount.

The amplitude limiting unit is configured to perform amplitude limiting on the direction control angle control amount to acquire the target direction control angle control amount for the current control period.

Further, the apparatus for controlling the movement of an autonomous mobile machine further includes a historical lateral deviation acquisition unit and a control output calculation unit.

The historical lateral deviation acquisition unit is configured to acquire, in a case where the current control period is not the first control period, a historical lateral deviation, which corresponds to each preview point in the current control period, in previous N control periods.

The output calculation unit is configured to:
calculate the control output of each preview point according to the control parameter of each preview point, the lateral deviation and the historical lateral deviation.

The control output calculation unit is configured to calculate the control output of each preview point according to the control parameter of each preview point, the lateral deviation and the historical lateral deviation.

A sixth embodiment of the present disclosure also provides an autonomous mobile machine. The autonomous mobile machine of this embodiment includes a machine body and a controller, wherein the controller includes a processor, a display, a memory and a computer program that is stored in the memory and is able to be run on the processor, such as a program for controlling movement of the autonomous mobile machine. The operations in the embodiment of the method for controlling the movement of an autonomous mobile machine described above, such as operation S10 shown in FIG. 1, are implemented when the processor executes the computer program. Or, the functions of each unit in each apparatus embodiment, such as the data acquisition module 10 shown in FIG. 4, are implemented when the processor executes the computer program.

Illustratively, the computer program can be partitioned into one or more modules that are stored in the memory and executed by the processor to complete the present disclosure. The one or more modules may be a series of computer program instruction segments capable of completing a particular function, the instruction segments being used to describe the execution of the computer program in the autonomous mobile machine.

The autonomous mobile machine may be a self-moving or moving machine such as a smart automobile, a pilotless automobile, a smart robot or an autonomous mobile robot. The autonomous mobile machine may include, but is not limited to, a processor, a memory, and a display. It will be understood by those skilled in the art that the schematic diagram is merely an example of an autonomous mobile machine, does not constitute a limitation to the autonomous mobile machine, may include more or less components than those illustrated, or may combine certain components, or different components. For example, the autonomous mobile machine may also include input and output devices, network access devices, buses, and the like.

The processor may be a Central Processing Unit (CPU), or may be other general-purpose processors, a Digital Signal Processor (DSP), an Application Specific Integrated Circuit (ASIC), a Field-Programmable Gate Array (FPGA) or other programmable logic devices, discrete gates or transistor logic devices, discrete hardware components, etc. The general-purpose processor may be a microprocessor or the processor may be any conventional processor or the like, which is a control center of the autonomous mobile machine, connecting various parts of the entire autonomous mobile using various interfaces and lines.

The memory may be used to store the computer program and/or module, and the processor implements various functions of the autonomous mobile machine by running or executing the computer program and/or module stored in the memory, and invoking data stored in the memory. The memory may mainly include a storage program area and a storage data area, wherein the storage program area may store an operating system, an application program required for at least one function (such as a sound playing function and a text conversion function); and the storage data area may store data created according to the use of a mobile phone (such as audio data and text message data). In addition, the memory may include a high-speed random access memory, and may also include a non-volatile memory such as a hard disk, a memory, a plug-in hard disk, a Smart Memory Card (SMC), a Secure Digital (SD) card, a flash card, at least one disk storage device, a flash device, or other volatile solid-state storage devices.

If implemented in the form of a software functional unit and sold or used as a standalone product, an integrated module of the autonomous mobile machine may be stored in a computer readable storage medium. Based on such understanding, all or part of the processes in the foregoing method embodiments are implemented by the present disclosure, and may also be completed by a computer program to instruct related hardware. The computer program may be stored in a computer readable storage medium. The operations of various method embodiments described above may be implemented when the computer program is executed by the processor. The computer program includes computer program code, which may be in the form of a source code, an object code, an executable file, or some intermediate forms. The computer readable medium may include any entity or apparatus capable of carrying the computer program code, a recording medium, a USB flash drive, a removable hard disk, a magnetic disk, an optical disk, a computer memory, a Read-Only Memory (ROM), a Random Access Memory (RAM), electrical carrier signals, telecommunications signals, and software distribution media. It is to be noted that the content contained in the computer readable medium may be appropriately increased or decreased according to the requirements of legislation and patent practice in a jurisdiction, for example, in some jurisdictions, according to legislation and patent practice, the computer readable medium does not include electrical carrier signals and telecommunication signals.

It is to be noted that the apparatus embodiments described above are merely illustrative, wherein the units described as separate components may or may not be physically separated, and the components displayed as units may or may not be physical units, which may be located in one place or distributed to multiple network units. Some or all of the modules may be selected according to actual needs to achieve the purpose of the solution of the present embodiment. In addition, in the drawings of the apparatus embodiments provided by the present disclosure, the connection relationship between the modules indicates that there is a communication connection therebetween, which may be implemented as one or more communication buses or signal lines. Those of ordinary skill in the art can understand and implement without any creative effort.

The above is a preferred implementation of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. A method for controlling movement of an autonomous mobile machine, comprising:
    acquiring a target path and a current state of the autonomous mobile machine, wherein the current state comprises a current speed and a current position;
    calculating at least one preview distance according to the current speed;
    acquiring at least one preview point each corresponding to a respective one of the at least one preview distance according to the target path and the at least one preview distance;
    calculating a position deviation from each preview point to the current position, wherein the position deviation is a lateral distance from the preview point to a current moving heading of the autonomous mobile machine, the current moving heading of the autonomous mobile machine being a current driving direction of the autonomous mobile machine;

acquiring a direction control angle parameter of a current control period according to the position deviation, the current speed and a preset parameter matching table, wherein the preset parameter matching table defines a direction control angle parameter of the autonomous mobile machine under a specific position deviation at a specific speed; and controlling the autonomous mobile machine to move according to the direction control angle parameter;

wherein there are a plurality of path points on the target path, and the acquiring at least one preview point each corresponding to a respective one of the at least one preview distance according to the target path and the at least one preview distance comprises:

for each the preview distance, calculating a distance between each path point and the current position, and taking a path point having a smallest distance as a closest point;

acquiring, starting from the closest point, a distance from each the path point to the current position according to a sequence of the plurality of path points in the target path, until a first path point which is spaced apart from the current position by a distance greater than or equal to the preview distance is acquired for a first time;

selecting a previous path point of the first path point as a second path point according to the target path;

performing interpolation processing at a preset interval between the first path point and the second path point to acquire an interpolation point set; and acquiring the preview point corresponding to the preview distance according to the preview distance and the interpolation point set;

wherein the controlling the autonomous mobile machine to move according to the direction control angle parameter comprises:

calculating a control parameter corresponding to each the preview point for the current control period according to the direction control angle parameter, the position deviation and the current speed, comprises: calculating a proportional parameter corresponding to each the preview point for the current control period according to the direction control angle parameter and the position deviation, wherein the proportional parameter corresponding to each the preview point is calculated by dividing the direction control angle parameter by the position deviation; and acquiring an integral parameter and a differential parameter corresponding to each the preview point for the current control period according to the current speed, wherein when the current speed does not reach a predetermined vehicle speed, the integral parameter is set to zero;

calculating a target direction control angle control amount for the current control period according to the position deviation and the control parameter of each the preview point; and controlling the autonomous mobile machine to move according to the target direction control angle control amount.

2. The method for controlling movement of an autonomous mobile machine as claimed in claim 1, wherein before acquiring the target path and the current state of the autonomous mobile machine, the method further comprises:

acquiring all first direction control angle parameters of the autonomous mobile machine under different position deviation s at a specific speed;

acquiring all second direction control angle parameters of the autonomous mobile machine under a specific position deviation at different speeds; and generating the parameter matching table according to all the first direction control angle parameters and all the second direction control angle parameters.

3. The method for controlling movement of an autonomous mobile machine as claimed in claim 1, wherein before calculating the at least one preview distance according to the current speed, the method further comprises:

establishing a tracking coordinate system according to the target path and the current state; and acquiring a current coordinate of the autonomous mobile machine according to the current position and the tracking coordinate system;

calculating the position deviation from each the preview point to the current position comprises:

calculating a preview coordinate of each the preview point according to the tracking coordinate system; and calculating the position deviation from each the preview point to the current position according to the current coordinate and the preview coordinate.

4. The method for controlling movement of an autonomous mobile machine as claimed in claim 1, wherein the preview distance comprises a remote preview distance and a near preview distance, the remote preview distance being a distance calculated based on the current speed and a preset remote preview time.

5. The method for controlling movement of an autonomous mobile machine as claimed in claim 1, wherein acquiring the direction control angle parameter of the current control period according to the position deviation, the current speed and the preset parameter matching table comprises:

judging whether there is an item, which contains a position deviation and a speed simultaneously matching the position deviation and the current speed, in the preset parameter matching table;

in a case where there is such an item, extracting a direction control angle parameter corresponding to the item from the parameter matching table; and in a case where there is no such the item, calculating the position deviation and the speed by linear interpolation according to the preset parameter matching table to acquire the direction control angle parameter for the current control period.

6. The method for controlling movement of an autonomous mobile machine as claimed in claim 1, wherein there are at least two preview points, and the at least two preview points comprise a remote preview point and a near preview point; the calculating of the target direction control angle control amount comprises:

calculating a remote preview control output $\delta 1$ and calculating a near preview control output $\delta 2$;

weighting the remote preview control output $\delta 1$ and the near preview control output $\delta 2$ and acquiring a direction control angle control amount $\delta$ by summing the remote preview control output $\delta 1$ and the near preview control output $\delta 2$, $\delta = a1 \cdot \delta 1 + a2 \cdot \delta 2$, wherein a1 represents a weight of the remote preview control output of the current control period, and a2 represents a weight of the near preview control output of the current control period;

acquiring the target direction control angle control amount by performing amplitude limiting on the direction control angle control amount δ;
wherein $$\begin{cases} \delta = \delta\max, \delta > \delta\max \\ \delta = \delta\min, \delta < \delta\min \end{cases}; \text{ and } \begin{cases} \delta - \delta' = \Delta\delta\max, \delta - \delta' > \Delta\delta\max \\ \delta - \delta' = -\Delta\delta\max, \delta - \delta' < -\Delta\delta\min \end{cases};$$

wherein δ represents the direction control angle control amount of a current control period, δ' represents the direction control angle control amount of a previous control period, max represents a preset maximum control amount, δmin represents a preset minimum control amount, Δδmax represents a preset maximum amount of error, and Δδmax is related to the current vehicle speed and the current control period.

7. The method for controlling movement of an autonomous mobile machine as claimed in claim 1, wherein there are at least two preview points, and calculating the target direction control angle control amount according to the position deviation and the control parameter of each the preview point comprises:
   calculating a control output of each the preview point according to the position deviation and the control parameter of each the preview point;
   weighting each control output to acquire a direction control angle control amount; and
   performing amplitude limiting on the direction control angle control amount to acquire the target direction control angle control amount for the current control period.

8. The method for controlling movement of an autonomous mobile machine as claimed in claim 7, further comprising: in a case where the current control period is not the first control period, acquiring a historical position deviation, which corresponds to each the preview point in the current control period, in previous N control periods, wherein
   calculating the control output of each the preview point according to the position deviation and the control parameter of each the preview point comprises:
   calculating the control output of each the preview point according to the control parameter of each the preview point, the position deviation and the historical position deviation.

9. A non-transitory storage medium, comprising a stored computer program, wherein when the computer program is run, a device where the computer readable storage medium is located is controlled to execute the method for controlling movement of an autonomous mobile machine as claimed in claim 1.

10. An autonomous mobile machine, comprising a machine body and a controller, wherein the controller comprises a processor, and a memory storing computer-readable instructions, which when executed by the processor, causes the processor to:
   acquire a target path and a current state of the autonomous mobile machine, wherein the current state comprises a current speed and a current position;
   calculate at least one preview distance according to the current speed;
   acquire at least one preview point each corresponding to a respective one of the at least one preview distance according to the target path and the at least one preview distance;
   calculate a position deviation from each preview point to the current position, wherein the position deviation is a lateral distance from the preview point to a current moving heading of the autonomous mobile machine, the current moving heading of the autonomous mobile machine being a current driving direction of the autonomous mobile machine;
   acquire a direction control angle parameter of a current control period according to the position deviation, the current speed and a preset parameter matching table, wherein the preset parameter matching table defines a direction control angle parameter of the autonomous mobile machine under a specific position deviation at a specific speed; and
   control the autonomous mobile machine to move according to the direction control angle parameter;
   wherein there are a plurality of path points on the target path, and the processor is further caused to:
   for each the preview distance,
   calculate a distance between each path point and the current position, and take a path point having a smallest distance as a closest point;
   acquire, starting from the closest point, a distance from each the path point to the current position according to a sequence of the plurality of path points in the target path, until a first path point which is spaced apart from the current position by a distance greater than or equal to the preview distance is acquired for a first time;
   select a previous path point of the first path point as a second path point according to the target path;
   perform interpolation processing at a preset interval between the first path point and the second path point to acquire an interpolation point set; and
   acquire the preview point corresponding to the preview distance according to the preview distance and the interpolation point set;
   wherein the processor controls the autonomous mobile machine to move according to the direction control angle parameter by:
   calculating a control parameter corresponding to each the preview point for the current control period according to the direction control angle parameter, the position deviation and the current speed, comprises: calculating a proportional parameter corresponding to each the preview point for the current control period according to the direction control angle parameter and the position deviation, wherein the proportional parameter corresponding to each the preview point is calculated by dividing the direction control angle parameter by the position deviation; and acquiring an integral parameter and a differential parameter corresponding to each the preview point for the current control period according to the current speed, wherein when the current speed does not reach a predetermined vehicle speed, the integral parameter is set to zero;
   calculating a target direction control angle control amount for the current control period according to the position deviation and the control parameter of each the preview point; and
   controlling the autonomous mobile machine to move according to the target direction control angle control amount.

11. The autonomous mobile machine as claimed in claim 10, wherein the processor is further caused to:
   acquire all first direction control angle parameters of the autonomous mobile machine under different position deviation s at a specific speed;

acquire all second direction control angle parameters of the autonomous mobile machine under a specific position deviation at different speeds; and generate the parameter matching table according to all the first direction control angle parameters and all the second direction control angle parameters.

12. The autonomous mobile machine as claimed in claim 10, wherein the processor is further caused to:

establish a tracking coordinate system according to the target path and the current state; and acquire a current coordinate of the autonomous mobile machine according to the current position and the tracking coordinate system;

calculate a preview coordinate of each the preview point according to the tracking coordinate system; and calculate the position deviation from each the preview point to the current position according to the current coordinate and the preview coordinate.

13. The autonomous mobile machine as claimed in claim 10, wherein the preview distance comprises a remote preview distance and a near preview distance, the remote preview distance being a distance calculated based on the current speed and a preset remote preview time.

14. The autonomous mobile machine as claimed in claim 10, wherein the processor is further caused to:

judge whether there is an item, which contains a position deviation and a speed simultaneously matching the position deviation and the current speed, in the preset parameter matching table;

in a case where there is such an item, extract a direction control angle parameter corresponding to the item from the parameter matching table; and in a case where there is no such the item, calculate the position deviation and the speed by linear interpolation according to the preset parameter matching table to acquire the direction control angle parameter for the current control period.

15. The autonomous mobile machine as claimed in claim 10, wherein there are at least two preview points, and the at least two preview points comprise a remote preview point and a near preview point; the processor calculates the target direction control angle control amount by:

calculating a remote preview control output $\delta 1$ and calculating a near preview control output $\delta 2$;

weighting the remote preview control output $\delta 1$ and the near preview control output $\delta 2$ and acquiring a direction control angle control amount $\delta$ by summing the remote preview control output $\delta 1$ and the near preview control output $\delta 2$, $\delta = a1 \cdot \delta 1 + a2 \cdot \delta 2$, wherein a1 represents a weight of the remote preview control output of the current control period, and a2 represents a weight of the near preview control output of the current control period;

acquiring the target direction control angle control amount by performing amplitude limiting on the direction control angle control amount $\delta$;

wherein $$\begin{cases} \delta = \delta max, \delta > \delta max \\ \delta = \delta min, \delta < \delta min \end{cases}; \text{ and } \begin{cases} \delta - \delta' = \Delta\delta max, \delta - \delta' > \Delta\delta max \\ \delta - \delta' = -\Delta\delta max, \delta - \delta' < -\Delta\delta min \end{cases};$$

wherein $\delta$ represents the direction control angle control amount of a current control period, $\delta'$ represents the direction control angle control amount of a previous control period, max represents a preset maximum control amount, $\delta min$ represents a preset minimum control amount, $\Delta\delta max$ represents a preset maximum amount of error, and $\Delta\delta max$ is related to the current vehicle speed and the current control period.

* * * * *